(No Model.)
R. B. MAGRUDER.
LAMP ATTACHMENT.
No. 363,658. Patented May 24, 1887.
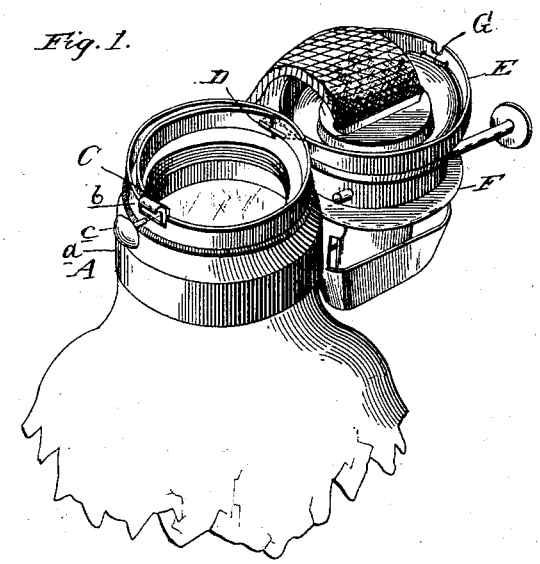
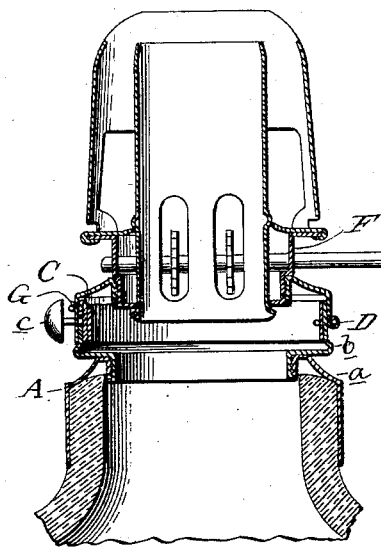
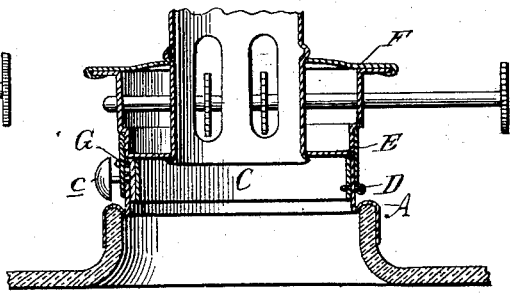
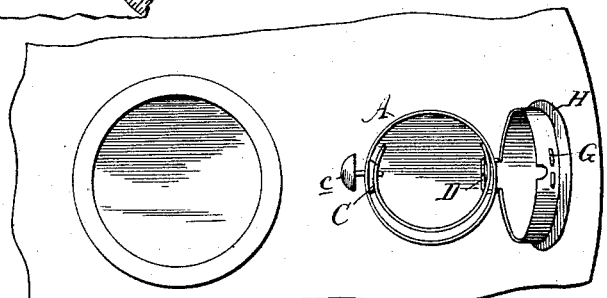
Witnesses
C. H. Raeder.
E. H. Bond.
Inventor
Richard B. Magruder
By his Attorney T. J. W. Robertson

UNITED STATES PATENT OFFICE.

RICHARD B. MAGRUDER, OF SANDY SPRING, ASSIGNOR OF ONE HALF TO JOHN H. SCHENKEL, OF BALTIMORE, MARYLAND.

LAMP ATTACHMENT.

SPECIFICATION forming part of Letters Patent No. 363,658, dated May 24, 1887.

Application filed September 2, 1886. Serial No. 212,488. (No model.)

*To all whom it may concern:*

Be it known that I, RICHARD B. MAGRUDER, a citizen of the United States, residing at Sandy Spring, in the county of Montgomery and State of Maryland, have invented certain new and useful Improvements in Lamp Attachments, of which the following is a specification, reference being had therein to the accompanying drawings, in which—

Figure 1 is a perspective view of a lamp provided with my attachment, with the burner open ready for filling. Fig. 2 is a central vertical section of the burner and its connecting parts. Fig. 3 is a similar view of a modification. Fig. 4 shows a side filler provided with my improvement in place of the screw-cap usually employed. All of these figures are on an enlarged scale the better to show the construction of the parts.

This invention relates to that class of lamps in which the burner is hinged, so that the fount may be filled without unscrewing; and the invention consists in the peculiar combination and the construction and arrangement of parts, hereinafter more particularly described, and then definitely pointed out in the claims.

Referring now to the details of construction, A represents the collar of the lamp, which may be either made in one or two pieces, as desired. If in two pieces, I make it to consist of the ordinary collar, as $a$, (see Figs. 1 and 2,) and a second section, as $b$, screwed into the first; or, if made in one piece, I propose to make it as shown in Fig. 3. The collar, whether made in one or two pieces, is provided with a spring-catch, C, having a knob or button, $c$, at one end, and its opposite end fastened to the inside of the collar by a wire, D, which passes through said collar and forms the pintle of a hinge, connecting collar B with a third collar, E, which is provided with a female screw-thread to receive the screw of the burner F, which may be of any ordinary or suitable construction.

In that form of my improvement shown in Fig. 3 the second section of the collar $b$ is dispensed with by using a different form of collar as a substitute for that form of collar shown in Figs. 1 and 2, to which collar the spring-catch and collar E are secured in the same way as they are secured to collar B.

As a means of connecting the collar E with the free or moving end of the spring-catch, I fasten a wire, G, to the collar E by passing the ends of the wire through holes in the collar and bending said ends down upon the outside. This makes a very good connection for the catch; but any other form may be used, at the will of the maker.

It will be seen that by this construction a very neat and convenient hinge and catch is formed, which can be easily made, is not likely to get out of order, and which will allow of the lamp being readily filled without the trouble of unscrewing the burner or cap, for it is obvious that the same device may be used on lamps or lanterns in which there is a side filling device covered by a cap, G, as shown in Fig. 4; and in the following claims where I refer to a "lamp-collar" I mean it to include a collar whether it is used on a filler or on the burner part of the lamp, and where I use the term "swinging part" I mean it to include a burner, as F, or the cover of a filling-orifice, as G.

What I claim as new is—

1. The combination, with a lamp-collar, as A, and a swinging part, as the burner F, of a spring-catch, C, connected with said collar and having its fixed end connected to the pintle on which the swinging part turns, substantially as described.

2. The combination, with a swinging part of a lamp, as the burner F, and the collar E, of a lamp-collar hinged to the collar E and formed of two sections, $a$ and $b$, said section $b$ having a small screw to pass into a female screw formed on the section $a$, and a spring-catch inclosed in said section $b$, substantially as described.

In testimony whereof I affix my signature, in presence of two witnesses, this 31st day of August, 1886.

RICHARD B. MAGRUDER.

Witnesses:
 JOHN F. VAN DEUSEN,
 GEO. H. WHITE.